US009048893B1

United States Patent
Sun et al.

(10) Patent No.: US 9,048,893 B1
(45) Date of Patent: Jun. 2, 2015

(54) DETERMINING CHANNEL INFORMATION USING DECISION FEEDBACK EQUALIZATION

(71) Applicant: Marvell International Ltd., Hamilton (BM)

(72) Inventors: Yakun Sun, Sunnyvale, CA (US); Mingguang Xu, San Jose, CA (US); Jie Huang, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/028,088

(22) Filed: Sep. 16, 2013

Related U.S. Application Data (60) Provisional application No. 61/702,467, filed on Sep. 18, 2012.

(51) Int. Cl.
*H04B 7/04* (2006.01)
*H04L 25/03* (2006.01)
*H04L 1/00* (2006.01)

(52) U.S. Cl.
CPC ........ *H04B 7/0417* (2013.01); *H04L 25/03885* (2013.01); *H04L 1/0054* (2013.01); *H04B 7/0413* (2013.01)

(58) Field of Classification Search
CPC .... H04B 7/024; H04B 7/0413; H04B 7/0452; H04B 7/0417; H04L 1/0048; H04L 1/005; H04L 1/0054; H04L 25/03885
USPC ......... 375/233, 259, 260, 262, 265, 267, 340, 375/341, 346, 347; 455/500, 513, 515, 455/67.13, 88; 714/794, 795
See application file for complete search history.

(56) References Cited

U.S. PATENT DOCUMENTS

| | | | |
|---|---|---|---|
| 2002/0191703 A1* | 12/2002 | Ling et al. | 375/267 |
| 2003/0035491 A1* | 2/2003 | Walton et al. | 375/267 |
| 2003/0108117 A1* | 6/2003 | Ketchum et al. | 375/295 |

OTHER PUBLICATIONS

Abe, et al., "Effective SINR Computation for Maximum Likelihood Detector in MIMO Spatial Multiplexing Systems", Global Telecommunications Conference, 2009, IEEE Globecom 2009.

Moon, et al., "Link Performance Estimation Techniques for MIMO-OFDM Systems with Maximum Likelihood Receiver", IEEE Transactions on Wireless Communications, vol. 11, Issue 5, May 5, 2012.

(Continued)

*Primary Examiner* — Young T Tse (57) ABSTRACT

In various embodiments, the present disclosure provides transmitters, receivers, and methods of determining channel state information for a maximum likelihood (ML) multiple input multiple output (MIMO) receiver, as well as transmitting and demodulating signals based on the determined channel state information. A ML MIMO receiver receives a first MIMO signal from a MIMO transmitter. Channel characteristics of the first MIMO signal are determined based on decision feedback equalization (DFE) processing. The DFE-determined channel characteristics, or information derived from the DFE-determined channel characteristics, are reported to the MIMO transmitter and the MIMO ML receiver decodes a second MIMO signal based on ML processing. The second MIMO signal is modulated and encoded by the MIMO transmitter according to a modulation and coding scheme in accordance with (1) the DFE-determined channel characteristics or (2) the information derived from the DFE-determined channel characteristics.

17 Claims, 5 Drawing Sheets

(56) References Cited

OTHER PUBLICATIONS

Ramesh, et al., "A Physical Layer Abstraction for Maximum Likelihood Demodulation of MIMO Signals", IEEE Vehicular Technology Conference, Spring 2009.

Sayana, et al., "Short Term Link Performance Modeling for ML Receivers with Mutual Information per Bit Metrics", Global Telecommunications Conference, 2008, IEEE Globecom 2008.

* cited by examiner

DETERMINING CHANNEL INFORMATION USING DECISION FEEDBACK EQUALIZATION

CROSS REFERENCE TO RELATED APPLICATIONS

The present disclosure claims priority to U.S. Provisional Patent Application No. 61/702,467, filed Sep. 18, 2012, which is incorporated herein by reference in its entirety.

TECHNICAL FIELD

Embodiments of the present disclosure relate to the field of wireless receivers, and in particular to using decision feedback equalization to determine channel state information for a maximum likelihood (ML) multiple input multiple output (MIMO) receiver.

BACKGROUND

A maximum likelihood (ML) multiple input multiple output (MIMO) receiver determines the most likely symbols of a received MIMO signal by jointly detecting the different streams of the MIMO signal. A ML MIMO receiver can theoretically receive data at closer to optimal performance for a given channel condition than can a linear receiver, but it is easier to predict the performance of a linear receiver than it is to predict the performance of a ML MIMO receiver. Predicting the performance of a receiver is important because doing so enables the transmitter to select a modulation and coding scheme (MCS) suitable for the channel's state at the receiver. Predicting less noise and interference than is actually present at the receiver causes the transmitter to transmit signals that the receiver cannot handle. And predicting more noise and interference than is actually present at the receiver causes the transmitter to transmit signals that underutilize the channel. Both result in wasted bandwidth.

Predicting the performance of a ML MIMO receiver is difficult because it is computationally intensive. A linear receiver may be used to approximate the ML MIMO receiver performance, but this fails to fully exploit the capabilities of a ML MIMO receiver. Other methods, such as least likelihood ratio (LLR) based mean mutual information per bit (MMIB) requires that data be transmitted to the ML MIMO receiver, which is not practical. Another method, LLR-based MMIB approximation is complex, requires empirically determined parameters, and relies on certain assumptions, such as an assumption that each stream will be equally modulated. Another method, which relies on a weighted average of minimum mean-square error (MMSE) and successive interference cancellation (SIC) signal-to-noise ratio (SNR), requires tuning of the weights, which may be dependent on the channel and the MCS, which increases the complexity. The weighted average also has questionable accuracy if certain assumptions do not hold.

SUMMARY

In various embodiments, the present disclosure provides a method of determining channel state information for a maximum likelihood (ML) multiple input multiple output (MIMO) receiver. A ML MIMO receiver receives a first MIMO signal having a plurality of streams from a MIMO transmitter. Channel characteristics of a stream of the plurality of streams of the first MIMO signal are determined based on decision feedback equalization (DFE) processing of at least one stream of the plurality of streams of the first MIMO signal. The DFE-determined channel characteristics, or information derived from the DFE-determined channel characteristics, are reported to the MIMO transmitter and the MIMO ML receiver decodes a second MIMO signal that is received from the MIMO transmitter. The decoding of the second MIMO signal is based on ML processing, and the second MIMO signal is modulated and encoded by the MIMO transmitter according to a modulation and coding scheme that is in accordance with (1) the DFE-determined channel characteristics or (2) the information derived from the DFE-determined channel characteristics.

In various embodiments, the present disclosure provides a ML MIMO receiver having a decision feedback equalization (DFE) component that (1) processes at least one stream of a plurality of streams of a first MIMO signal received from a MIMO transmitter and (2) determines, based on DFE processing of the at least one stream of the plurality of streams of the first MIMO signal, DFE-determined channel characteristics of the at least one stream of the first MIMO signal. The receiver includes a report module that reports (1) the DFE-determined channel characteristics or (2) information derived from the DFE-determined channel characteristics to the MIMO transmitter. The receiver includes a ML component that demodulates and decodes a second MIMO signal received from the MIMO transmitter. The decoding uses ML processing. The second MIMO signal is modulated and encoded according to a modulation and coding scheme that is in accordance with (1) the DFE-determined channel characteristics or (2) the information derived from the DFE-determined channel characteristics.

In various embodiments, the present disclosure provides a wireless system having a multiple-input multiple-output (MIMO) transmitter that transmits a first MIMO signal having a plurality of streams, and a maximum likelihood (ML) MIMO receiver. The ML MIMO receiver receives the first MIMO signal, processes at least one stream of a plurality of streams of the first MIMO signal, determines DFE-determined channel characteristics of the at least one stream based on decision feedback equalization (DFE), and reports to the MIMO transmitter (1) the DFE-determined channel characteristics or (2) information derived from the DFE-determined channel characteristics. The MIMO transmitter transmits a second MIMO signal to the ML MIMO receiver that is modulated and coded by the MIMO transmitter according to a modulation and coding scheme selected in accordance with (1) the DFE-determined channel characteristics or (2) the information derived from the DFE-determined channel characteristics. The ML MIMO receiver receives the second MIMO signal and demodulates and decodes the second MIMO signal using ML processing.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure include maximum likelihood (ML) multiple input multiple output (MIMO) receivers that determine channel state information (CSI) based on decision feedback equalization (DFE). ML MIMO receivers operate by predicting, for each stream of a MIMO transmission, the most likely signal for the other streams before making a decoding decision. This joint determination enables more accurate decoding and increased utilization of the channel than is generally achieved with linear receivers. DFE receivers utilize linear equalization on a received signal to determine the interference of the other streams before decoding a particular stream. Thus, conceptually, both ML and DFE consider the impact of other streams when making a decoding decision for a particular stream. Determining channel state using DFE is employed by embodiments to estimate the channel conditions for a ML MIMO receiver. The DFE-determined channel state information (CSI) is then used to select a modulation and coding scheme (MCS) for transmission to the ML MIMO receiver. Using DFE-determined channel characteristics to select the MCS for a ML MIMO receiver results in higher throughput, and transition to higher rank (e.g., rank-2) transmission (transition from a one-stream to a multiple-stream MIMO transmission) at a lower signal-to-interference-plus-noise ratio (SINR) compared to when using conventional methods of determining CSI for a ML MIMO receiver.

Figure 1:
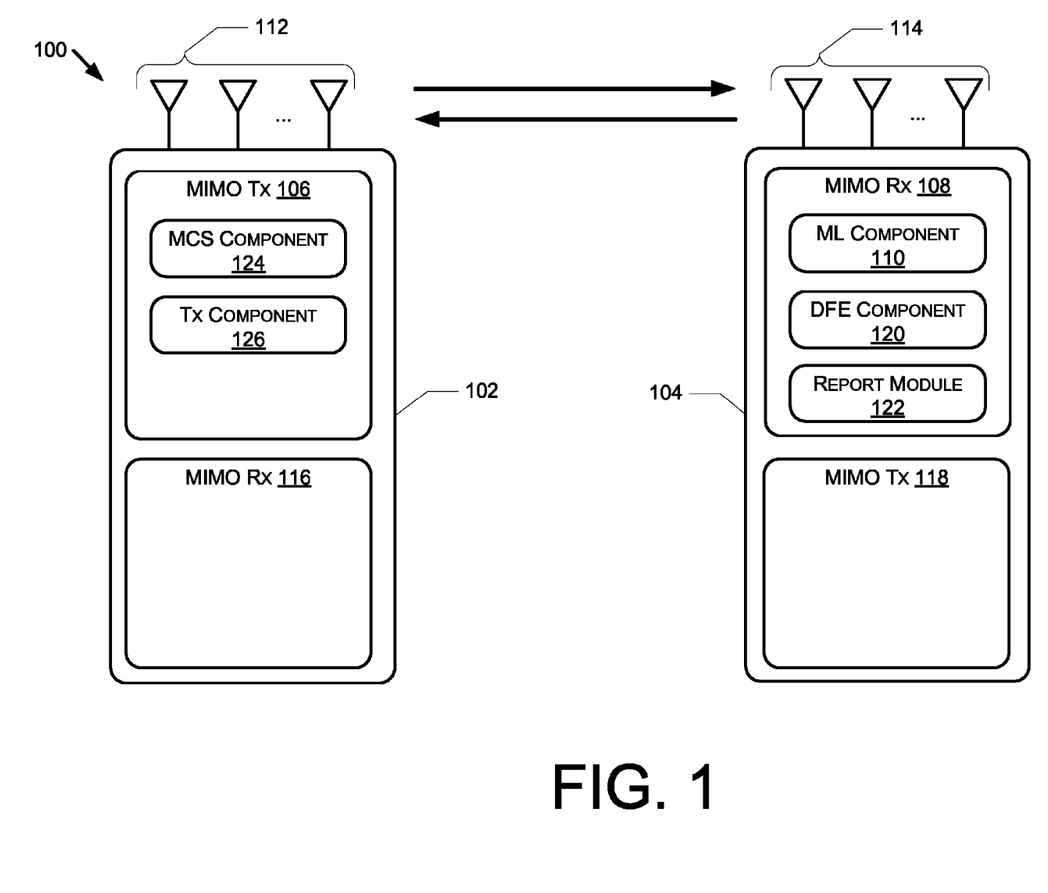
FIG. 1 schematically illustrates a MIMO transmission system that employs a decision feedback equalization (DFE) to determine channel characteristics.

FIG. 1 schematically illustrates a MIMO transmission system 100 that employs DFE to determine channel characteristics. The MIMO transmission system 100 includes a first device 102 and a second device 104. The first and second devices 102 and 104 are wireless devices, such as mobile phones, smart phones, wireless routers, wireless modems, and so forth. Embodiments are not limited to any type or types of wireless devices.

The first device 102 includes a MIMO transmitter 106, and the second device 104 includes a MIMO receiver 108. The MIMO receiver is a maximum likelihood (ML) MIMO receiver, and thus includes a ML component 110 configured to employ ML processing to decode symbols or bits in multiple streams that are in a transmission signal produced by the MIMO transmitter 106.

The first device 102 includes a plurality of antennas 112, and the second device 104 includes a plurality of antennas 114. The first device 102 may also include a MIMO receiver 116, which may be the same as or similar to the MIMO receiver 108. And the second device may also include a MIMO transmitter 118, which may be the same as or similar to the MIMO transmitter 106. The plurality of antennas 112 are communicatively coupled at least to the MIMO transmitter 106 for transmitting signals, and the plurality of antennas 114 are communicatively coupled at least to the MIMO receiver 108 for receiving signals.

The MIMO receiver 108 includes a DFE component 120 configured to determine, based on DFE processing, the channel characteristics of at least one stream of a plurality of streams of a MIMO signal that is transmitted by the MIMO transmitter 106. A report module 122 is configured to report either the DFE-determined channel characteristics or the information derived from the DFE-determined channel characteristics to the MIMO transmitter 106 (e.g., cause a report to be transmitted or otherwise communicated). An MCS module 124 in the MIMO transmitter 106 receives either the DFE-determined channel characteristics, or the information derived from the DFE-determined channel characteristics, and selects an MCS coding scheme for modulating and coding transmission signals to be transmitted to the MIMO receiver 108. The channel characteristics may be, for example, signal-to-interference-plus-noise (SINR) or some other measure of channel state information, such as signal-to-noise ratio (SNR), mean mutual information per bit (MMIB), or other. In addition, the channel characteristics may include the precoding matrix, which may implicitly reflect the number of MIMO streams. The precoding matrix is what the other channel characteristics (e.g., SNR, SINR, MMIB) are based on. In another embodiment, the channel characteristics may include a set of precoding matrices, one for each configuration of MIMO streams, where a set of channel characteristics (e.g., SNR, SINR, MMIB) are reported, one for each configuration.

The information derived from the DFE-determined channel characteristics is, in some embodiments, the MCS selected for the transmission. In other words, the DFE component 120, or the report module 122, may select the MCS based on the DFE-determined channel characteristics and transmit an indication of the selected MCS to the MCS component 124. In addition, the information derived may include the precoding matrix indicator (PMI), and implicitly or explicitly the preferable number of MIMO streams (rank indicator, or RI). The MCS are derived assuming the reported PMI and/or RI. In another embodiment, the information may include a set of precoding matrix indicators, one for each supportable rank indicator. In such a case, a set of MCSs are reported, one for each RI. Alternatively, the information derived from the DFE-determined channel characteristics may be an identifier that identifies a range that the DFE-determined channel characteristics fall into (such as a range of MMIB or a range of SINR, or other), from which the appropriate MCS may be selected.

The MIMO transmitter 106 includes a transmission component 126 configured to modulate and encode a MIMO transmission signal according to the selected MCS. The ML component 110 receives the transmitted MIMO signal and demodulates and decodes it using ML processing. The second MIMO signal is modulated and encoded according to a modulation and coding scheme selected in accordance with the DFE-determined channel characteristics. Thus, the MIMO receiver 108 is configured to perform both DFE processing (to determine channel characteristics) and ML processing (to decode the transmitted signals). DFE is used to set a lower bound for the channel performance, but strictly superior to the performance predicted by assuming a linear receiver, of the ML receiver.

Figure 2:
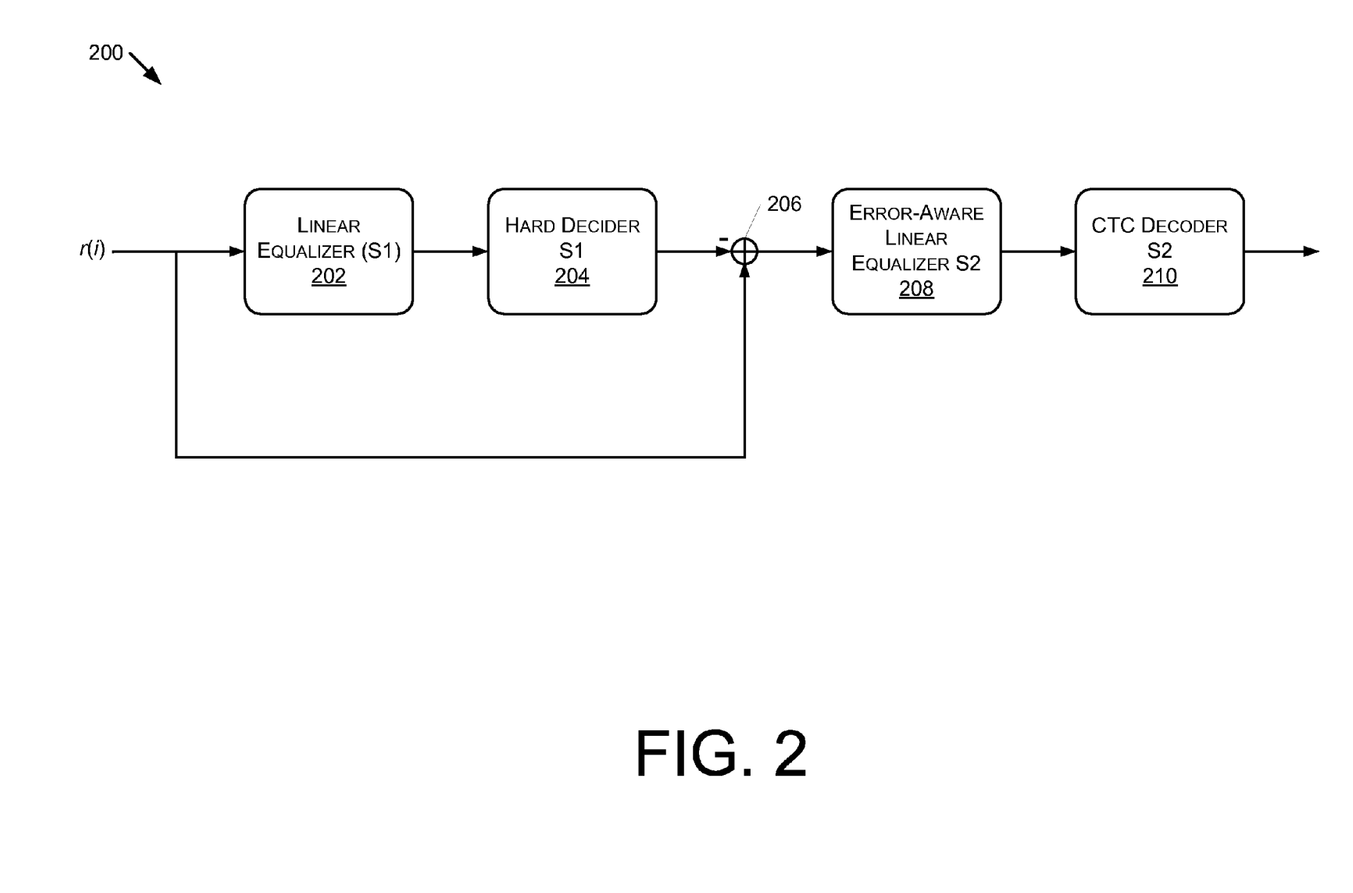
FIG. 2 schematically illustrates a DFE circuit used to determine symbols in a two-stream MIMO signal.
Figure 3:
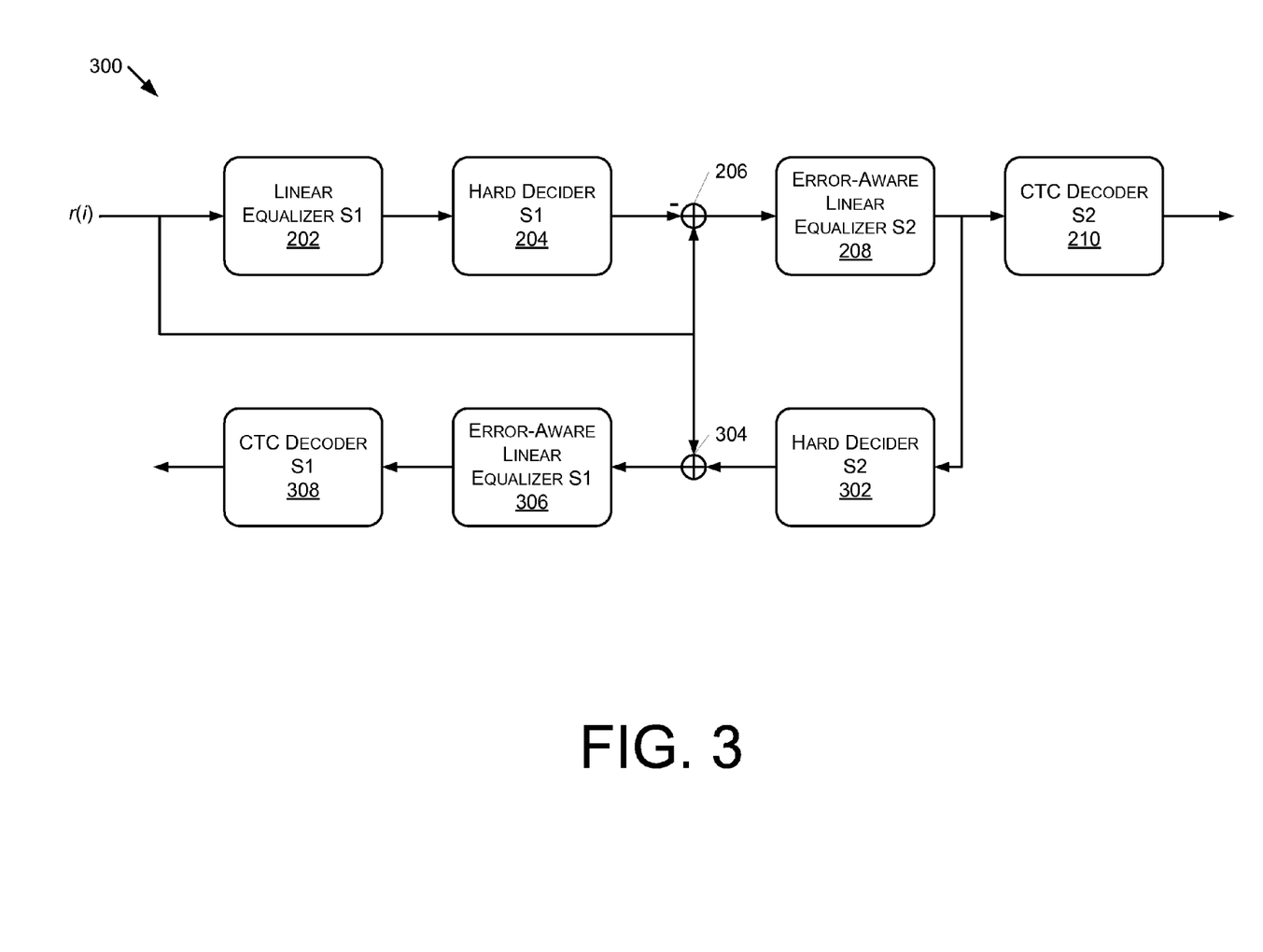
FIG. 3 schematically illustrates a DFE circuit used to iteratively determine symbols in a two-stream MIMO signal.
Figure 4:
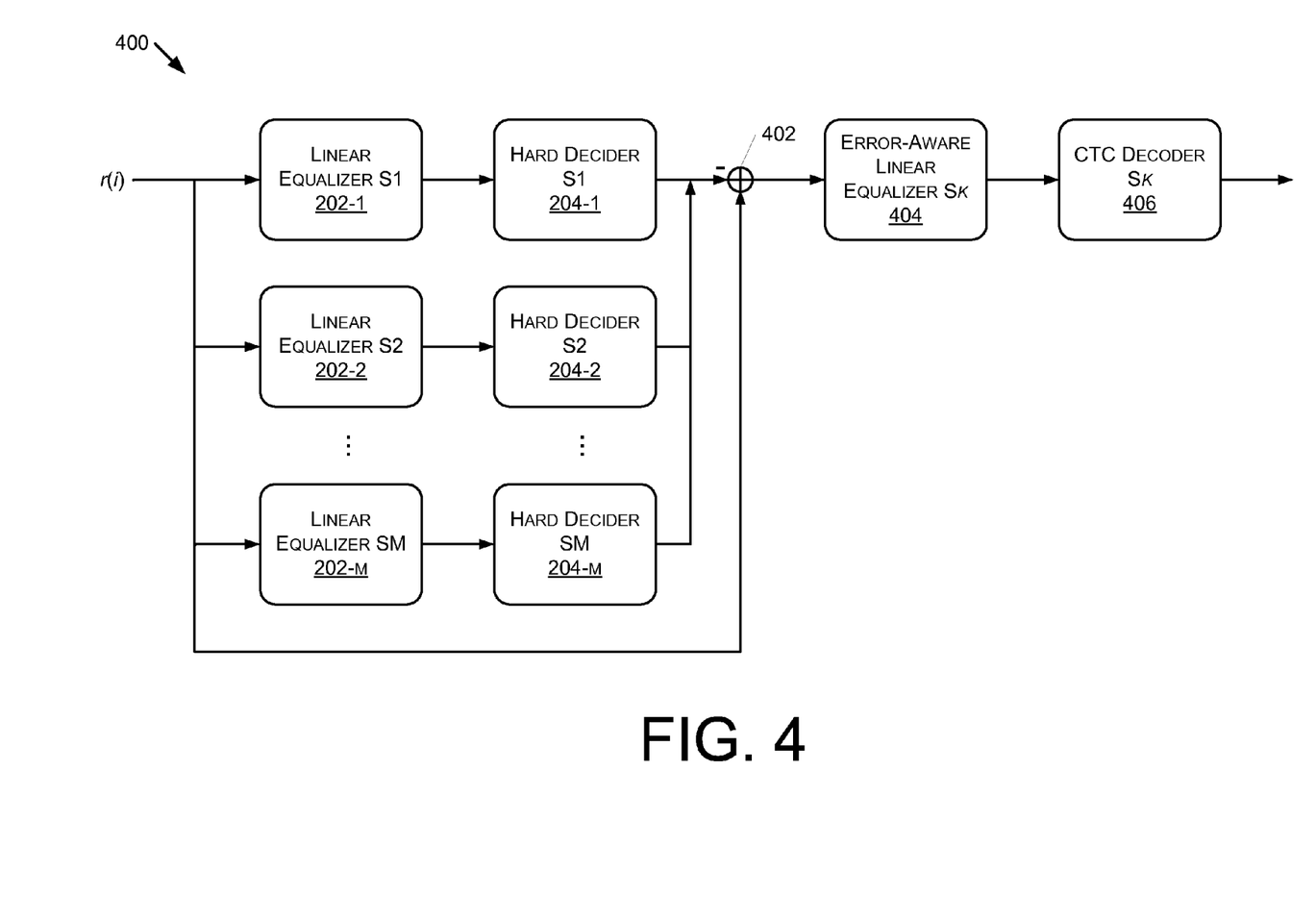
FIG. 4 schematically illustrates a DFE circuit to determine symbols in a S-stream MIMO signal.

FIG. 2 schematically illustrates a DFE circuit 200 to determine symbols in a two-stream MIMO signal. The DFE circuit 200 may be part of the DFE component 120. The example DFE circuit 200 illustrated in FIG. 2 shows conceptually how a first signal (S1) of a first stream is removed from a received signal r(i) using DFE in order to decode symbols of a second signal (S2). The DFE component 120 then utilizes the conceptually decoded signals to determine channel characteristics for the second signal S2, as will be described in more detail below. Although FIG. 2 illustrates a conceptual circuit for performing DFE on a two-stream MIMO signal, embodiments are generalized to an n-stream MIMO signal, as is described with reference to FIG. 4 below. It is to be noted that FIG. 2 can be implemented in computer instructions, or mixed circuits and instructions. A circuit implementation of FIG. 2, and also FIGS. 3 and 4, are only examples.

The received MIMO signal r(i) goes through a linear equalizer 202. In the examples described below, the linear equalization used is minimum mean square error (MMSE) equalization, although other linear equalization schemes may be employed without departing from the scope of embodiments. The equalized signal goes into a hard decider 204, which makes a hard symbol decision for S1 of a first stream. The S1 symbols are subtracted from the received signal r(i), at component 206, thereby cancelling the estimated S1 symbols from r(i).

The resulting signal goes through an error-aware linear equalizer 208 (e.g., utilizing MMSE equalization or other linear equalization), thereby determining the signals of the second stream S2. A channel decoder 210 decodes the symbols of the second stream S2. The channel decoder corresponds to the encoder at the transmitters. An example channel decoder is a convolutional turbo en/decoder (CTC), although other suitable channel encoder/decoders may be used without departing from the scope of embodiments. The channel decoder 210 takes hard input (e.g., a binary bit or a modulated symbol), or soft input (e.g., a likelihood of a bit or a modulated symbol). The equalizer of 208 will output the information as channel decoder prefers. Similar steps can be applied to detect the symbols of the first stream S1.

DFE performance can be predicted based on the SINR of the streams of the signal r(i). The demodulation errors of the other streams are taken into account when determining the DFE performance. In the example shown in FIG. 2, which determines symbols for a two-stream received signal (S=2), and where MMSE equalization is employed at both 202 and 208, the following equations can be used to calculate the SINR (a different SINR formulation is used where different (non-MMSE) linear equalizers are used instead).

$$SINR_{2,MMSE-\frac{DFE}{ML}} =$$

$$SINR(h_2, h_1, E[|\tilde{x}_1 - x_1|^2], \sigma^2) = h_2^H (h_1 h_1^H E[|\tilde{x}_{1,MMSE} - x_1|^2] + \sigma^2 I)^{-1} h_2$$

$$\tilde{x}_1 = \operatorname{argmin}|\hat{x}_1 - s_1|^2$$

Where $\hat{x}_1$ is the MMSE equalizer output as $$\hat{x}_1 = h_1^H (HH^H + \sigma^2 I) r$$

and $\tilde{x}_1$ is the hard decision of S1 based on the constellation, i.e., $$\tilde{x}_1 = \operatorname{arg\,min}|\hat{x}_1 - s_1|^2$$

Where the received signal is given by:

$$y = Hx + z = \begin{bmatrix} h_1 & h_2 & \ldots & h_s \end{bmatrix} \begin{bmatrix} x_1 \\ \vdots \\ x_s \end{bmatrix} + z$$

where:
$SINR_{2,MMSE-DFE/ML}$: the DFE-determined SINR for stream 2 of the ML receiver,
R: number of receiver antennas,
S: number of spatial streams (layers),
H: =R×S: the effective channel matrix (after precoding), (S=2 for the example above).

$h_k$=R×1: the effective channel for the kth spatial stream (the kth column of H),
x=S×1: the transmitted symbol vector,
$x_k$: the modulated symbol for the kth stream, within constellation $\Omega^{(k)} = \{s^{(n)}; n=0 \ldots |\Omega^{(k)}|-1\}$,
z: circularly symmetric Gaussian noise, $E[zz^H]=\sigma^2 I_R$, where $I_R$ is a R-by-R identity matrix, and $\sigma^2$ is the noise correlation.

The term $E[|\tilde{x}_{1,MMSE} - x_1|^2]$ represents the residual interference, or the interference cancellation error. It may be computed online, or stored as a look-up table offline. The details of obtaining this term are explained below.

The DFE-determined SINR is used to select the proper MIMO scheme and MCS. Given the SINR for the signal S2, a variety of methods may be applied to predict the performance. In some embodiments, the sequence of SINR for each symbol of S2 is translated to an effective SNR. An effective SNR-to-performance function is used to map the effective SNR to a preferred performance metric, e.g., block error rate (BLER), for a particular MCS/MIMO scheme. A suitable MCS/MIMO scheme is then selected after the performance of each is predicted. The details of selecting MIMO scheme/MCS based on SINR are beyond the scope of this disclosure. The effective-SNR-to performance function may be employed as a look-up table or other method.

As mentioned above, the demodulation error is taken into account when determining the SINR. One method of doing this, when using MMSE as the linear equalization method, is now described. An assumption is made that the stream 2 interference is Gaussian when demodulating stream 1, which is the stream with the stronger signal. SINR is thus given as:

$$SINR_{1,MMSE} = \frac{1}{\langle (H^H H + \sigma^2 I)^{-1} \rangle_{1,1} \sigma^2} - 1 = h_1^H (h_2 h_2^H + \sigma^2 I)^{-1} h_1$$

The hard decision for stream 1 is made at the output of the MMSE receiver, and the demodulation error probability is:

$$P(\tilde{x}_{1,MMSE} = s_1^{(n)}, n \neq k | x_1 = s_1^{(k)})$$

The residual error covariance is then:

$$E[|\tilde{x}_{1,MMSE} - x_1|^2] = \frac{1}{|\Omega_1|} \sum_{k=1}^{|\Omega_1|} \sum_{n=1}^{|\Omega_1|} P(\tilde{x}_1 = s_1^{(n)} | s_1^{(k)}) |s_1^{(n)} - s_1^{(k)}|^2$$

Approximately, when SINR is high, only the direct neighbor points in the constellations are counted:

$$E[|\tilde{x}_{1,MMSE} - x_1|^2] = \frac{1}{|\Omega_1|} \sum_{k=1}^{|\Omega_1|} \sum_{|s_1^{(n)} - s_1^{(k)}| = d_{min}} P(\tilde{x}_{1,MMSE} = s_1^{(n)} | s_1^{(k)}) \times d_{min}^2$$

Either way, the residual error covariance can be computed offline and stored in a look-up table:

$$E[|\tilde{x}_{1,MMSE} - x_1|^2] = f(SINR_{1,MMSE})$$

FIG. 3 schematically illustrates a DFE circuit 300 used by the DFE component 120 to iteratively determine symbols in a two-stream MIMO signal. The DFE circuit 300 is used by or part of the DFE component 120. The DFE circuit 300 includes the linear equalizer 202, the hard decider 204, the component 206, the error-aware linear equalizer 208, and the channel decoder 210 as are illustrated in FIG. 2 and described elsewhere within this Detailed Description. In addition, the DFE circuit includes a hard decider 302, which subtracts the equalized signal that emerges from the error-aware linear equalizer 208 from the received signal r(i) at component 304. Error-aware linear equalization is performed on the resulting signal at the error-aware linear equalizer 306. The resulting equalized signal is then decoded using a channel decoder 308 to produce estimates of the symbols for stream 1. Thus, DFE circuit 300 utilizes DFE to remove the interference of stream 1 in order to determine symbols for stream 2, and then removes the symbols from stream 2 in order to determine the symbols for stream 1. The procedure is used to calculate CSI (e.g., SINR) of stream 1 and stream 2.

This iterative process may be repeated a certain number of times or until a threshold is met, such as where the iterative SINRs for a stream converge on a result. Thus, the resulting signal that emerges from the error-aware linear equalizer 306 could be run through a hard decider, and the resulting symbols subtracted from the received signal r(i) in order to re-determine the symbols for stream 2, and so on.

FIG. 4 schematically illustrates a DFE circuit 400 used by the DFE component 120 to determine symbols in an S-stream MIMO signal, where S is an appropriate integer that is ≥2. The DFE circuit 200 illustrated in FIG. 2, and the DFE circuit 300 in FIG. 3, are used to determine Symbols for a stream 2 in a two-stream MIMO transmission. But the process can be generalized for any number of streams, as is illustrated in FIG. 4.

For the kth stream, we partition the rest of the S-1 streams into two groups, and linear equalization is performed on the $n_k$ streams in one group for which the set is defined as:

$$S_k = \{s_1^{(k)} \ldots s_{n_k}^{(k)}\} \subseteq \{1 \ldots S\}$$

For the kth stream the DFE circuit 400 includes m=$n_k$ linear equalizers 202 (e.g., 202-1, 202-2 ... 202-m) and m=$n_k$ hard deciders 204 (e.g., 204-1, 204-2, 204-m). The resulting symbols for all but the kth stream are fed into component 402, which subtracts the resulting symbols in the first group from the received signal r(i), at which point the resulting signal is fed to the error-aware linear equalizer 404, and the symbols for the kth stream are decoded using the channel decoder 406. The error-aware linear equalizer 404 takes into account the residual interference from streams not in the set $S_k$, and the demodulation errors for the streams that are in the set $S_k$. The performance (SINR) of the kth stream can be approximated by:

$$SINR_{k,MMSE-DFE/ML} = SINR(h_i, i \notin S_k; h_j, E(|\tilde{x}_j - x_j|^2), j \in S_k; \sigma^2)$$
$$= h_k^H \left( \sum_{i \notin S_k} h_i h_i^H + \sum_{j \in S_k} h_j h_j^H E(|\tilde{x}_{j,MMSE} - x_j|^2) + \sigma^2 I \right)^{-1} h_k$$

An iterative process, as illustrated above for two streams in FIG. 3, can also be extended to S streams using a conceptual circuit similar to the DFE circuit 300, such as by using a hard decider to produce symbols for a kth stream, and subtracting them from the received symbol r(i) and feeding that into a DFE process for generating symbols from the others of the S streams. Symbols for all S streams can be produced in this fashion. As with the process illustrated in FIG. 3, this iterative process can be repeated a certain number of times, or until the CSI (e.g., SINR) results converge. In another embodiment, the order and combinations of streams are decoded and subtracted and may be arbitrary and dynamic. For example, some streams can be extracted by using linear equalizer output, and some other streams can be extracted by using error-aware linear equalizer. For another example, the streams can be extracted by using output from different numbers of iterations.

Figure 5:
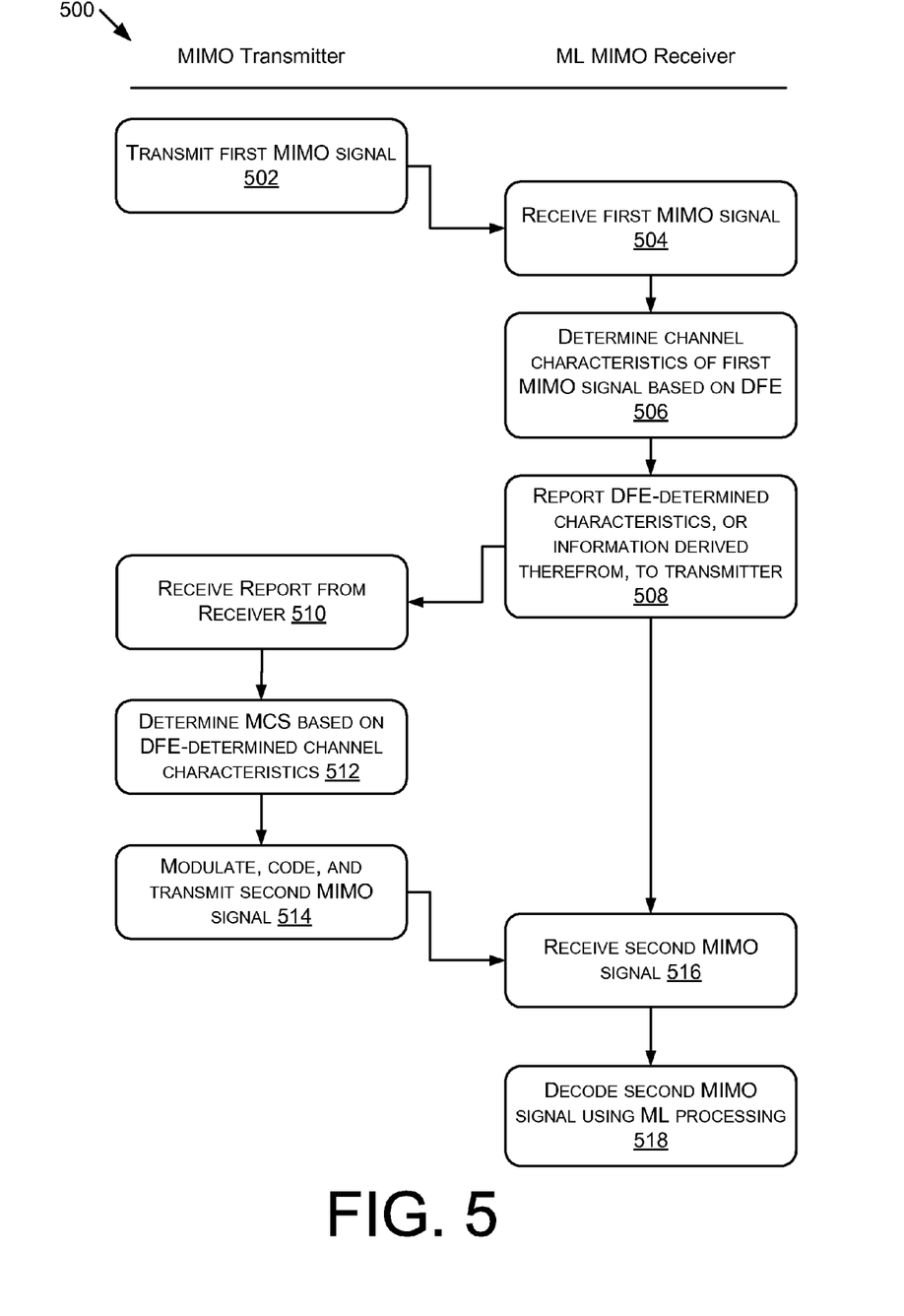
FIG. 5 illustrates a method of utilizing DFE-determined channel characteristics to set a modulation and coding scheme (MCS) for transmission to a ML MIMO receiver.

FIG. 5 illustrates a method 500 of utilizing DFE-determined channel characteristics to set a modulation and coding scheme (MCS) for transmission to a ML MIMO receiver. At 502, a MIMO transmitter, such as the MIMO transmitter 106, transmits a first MIMO signal having a plurality of streams (e.g., at least two streams). At 504, a MIMO ML receiver receives the first MIMO signal.

At 506, the ML MIMO receiver determines channel characteristics for one or more of the streams of the plurality of streams, the channel characteristics determined by decision feedback equalization (DFE). The ML MIMO receiver may utilize an iterative process to determine the DFE-determined channel characteristics.

At 508 the ML MIMO receiver reports to the MIMO transmitter (i) the DFE-determined channel characteristics and/or (ii) information derived from the DFE-determined channel characteristics, as is described in more detail elsewhere within this Detailed Description. And at 510, the transmitter receives the reported DFE-determined channel characteristics or the information derived from the DFE-determined channel characteristics.

At 512, the MIMO transmitter determines the modulation and coding scheme (MCS) based on the DFE-determined channel characteristics (or on the information derived from the DFE-determined channel characteristics). For example, a more aggressive MCS may be used where the channel characteristics indicate low noise and interference, and a relatively less aggressive MCS may be used where the channel characteristics indicate that high noise and interference are present at the receiver.

At 514, the selected MCS is used by the MIMO transmitter to modulate and code a second MIMO signal to be transmitted to the ML MIMO receiver. At 516, the ML MIMO receiver receives the second MIMO signal.

At 518, the ML MIMO receiver decodes the second MIMO signal using ML processing. Thus, the ML MIMO receiver determines channel characteristics of the channel using DFE processing, but utilizes ML processing to decode the transmitted signals that are modulated and coded using MCS selected from the DFE-determined channel characteristics.

In accordance with various embodiments, an article of manufacture may be provided that includes a storage medium having instructions stored thereon that, if executed, result in the operations described herein with respect to the method 500 of FIG. 5 (and/or various other operations discussed in the present disclosure). In an embodiment, the storage medium comprises some type of non-transitory memory. In accordance with various embodiments, the article of manufacture may be a computer-readable medium that includes the instructions, such as, for example, software or firmware embodied on a hard drive, digital video disc (DVD), Random Access Memory (RAM), or other non-transitory memory.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
   receiving, by a maximum likelihood (ML) multiple-input multiple-output (MIMO) receiver, a first MIMO signal having a plurality of streams, wherein the first MIMO signal having the plurality of streams is received from a MIMO transmitter;
   determining, by decision feedback equalization (DFE), DFE-determined channel characteristics of a stream of the plurality of streams of the first MIMO signal;
   reporting to the MIMO transmitter the DFE-determined channel characteristics; and
   decoding, by the ML MIMO receiver, a second MIMO signal that is received from the MIMO transmitter, wherein the decoding of the second MIMO signal is based on ML processing, and wherein the second MIMO signal is modulated and encoded by the MIMO transmitter according to a modulation and coding scheme that is in accordance with the DFE-determined channel characteristics.

2. The method of claim 1, further comprising determining the DFE-determined channel characteristics based at least on symbols of the first MIMO signal.

3. The method of claim 2, wherein determining the DFE-determined channel characteristics of the stream of the plurality of streams includes determining a performance metric of the stream based at least on the symbols of the first MIMO signal, and the method further comprises:
   selecting the modulation and coding scheme for transmissions to the ML MIMO receiver based at least on the performance metric of the stream,
   wherein the performance metric includes signal-to-interference-plus-noise ratio (SINR).

4. The method of claim 2, further comprising determining a performance metric of determining the symbols of the stream by:
   removing, from the first MIMO signal, other symbols decoded from one or more other streams of the plurality of streams;
   performing error-aware linear equalization on the first MIMO signal after the other symbols have been removed to produce an equalized signal; and
   decoding remaining symbols from the equalized signal.

5. The method of claim 1, wherein (1) the stream of the plurality of streams is a first stream, (2) the DFE-determined channel characteristics of the first stream are first DFE-determined channel characteristics, and (3) the method further comprises:
   determining second DFE-determined channel characteristics of a second stream of the plurality of streams of the first MIMO signal; and
   reporting the second DFE-determined channel characteristics,
   the modulation and coding scheme being in accordance with the first DFE-determined channel characteristics and the second DFE-determined channel characteristics.

6. The method of claim 5, wherein:
   the first DFE-determined channel characteristics are determined based at least on a first performance metric of determining the first symbols of the first stream of the first MIMO signal; and
   the second DFE-determined channel characteristics are determined based at least on a second performance metric of determining the second symbols of the second stream of the first MIMO signal.

7. The method of claim 6, further comprising determining the performance metric of determining the first symbols based at least on the second symbols.

8. A maximum likelihood (ML) multiple-input multiple-output (MIMO) receiver, comprising:
   a decision feedback equalization (DFE) component configured to perform DFE processing on at least one stream of a plurality of streams of a first MIMO signal received from a MIMO transmitter;
   a signal-to-interference-plus-noise ratio (SINR) component configured to determine, based on the DFE processing of the at least one stream of the plurality of streams of the first MIMO signal, DFE-determined channel characteristics of the at least one stream of the plurality of streams of the first MIMO signal;
   a report module configured to report to the MIMO transmitter the DFE-determined channel characteristics; and
   a ML component configured to demodulate and decode a second MIMO signal received from the MIMO transmitter, the decode using ML processing, the second MIMO signal modulated and encoded according to a modulation and coding scheme, the modulation and coding scheme in accordance with the DFE-determined channel characteristics.

9. The ML MIMO receiver of claim 8, wherein the DFE component is further configured to perform the DFE processing of the at least one stream by:
   removing, from the first MIMO signal, one or more other symbols decoded from one or more other streams of the plurality of streams;
   performing error-aware linear equalization on the first MIMO signal after the one or more other symbols have been removed to produce an equalized signal; and
   decoding the symbols from the equalized signal.

10. The ML MIMO receiver of claim 8, wherein (1) the at least one stream includes a first stream and a second stream, (2) the DFE-determined channel characteristics are first DFE-determined channel characteristics of the first stream, and (3) the DFE component is further configured to:
    determine second DFE-determined channel characteristics of the second stream; and
    wherein the report module is further configured to report (1) the second DFE-determined channel characteristics,
    the modulation and coding scheme being in accordance with the first DFE-determined channel characteristics and the second DFE-determined channel characteristics.

11. The ML MIMO receiver of claim 10, wherein:
    the first DFE-determined channel characteristics are determined based at least on a performance metric of determining the first symbols of the first stream of the first MIMO signal; and the second DFE-determined channel characteristics are determined based at least on a performance metric of determining the second symbols of the second stream of the first MIMO signal.

12. The ML MIMO receiver of claim 11, wherein the SINR component is further configured to iteratively determine the performance metric of determining the first symbols based on the second symbols.

13. A wireless system comprising:
a multiple-input multiple-output (MIMO) transmitter configured to transmit a first MIMO signal having a plurality of streams; and
a maximum likelihood (ML) MIMO receiver configured to:
receive the first MIMO signal;
process at least one stream of the plurality of streams of the first MIMO signal;
determine, based on decision feedback equalization (DFE) processing of the at least one stream of the plurality of streams of the first MIMO signal, DFE-determined channel characteristics of the at least one stream of the plurality of streams of the first MIMO signal; and
report to the MIMO transmitter the DFE-determined channel characteristics,
wherein the MIMO transmitter is further configured to transmit a second MIMO signal to the ML MIMO receiver, the second MIMO signal modulated and coded by the MIMO transmitter according to a modulation and coding scheme selected in accordance with the DFE-determined channel characteristics, and
wherein the ML MIMO receiver is further configured to (1) receive the second MIMO signal and (2) demodulate and decode the second MIMO signal using ML processing.

14. The wireless system of claim 13, wherein the ML MIMO receiver is further configured to
determine a performance metric of determining symbols of the at least one stream of the plurality of streams, and
determine the DFE-determined channel characteristics based at least on the performance metric of determining symbols of the at least one stream.

15. The wireless system of claim 14, wherein the ML MIMO receiver is further configured to determine the performance metric of determining symbols of the at least one stream by:
removing, from the first MIMO signal, one or more other symbols decoded from one or more other streams of the plurality of streams;
performing error-aware linear equalization on the first MIMO signal after the one or more other symbols have been removed to produce an equalized signal; and
decoding the symbols from the equalized signal.

16. The wireless system of claim 13, wherein (1) the at least one stream includes a first stream and a second stream, (2) the DFE-determined channel characteristics are first DFE-determined channel characteristics of the first stream, and (3) the ML MIMO receiver is further configured to:
determine second DFE-determined channel characteristics of the second stream, the second DFE-determined channel characteristics determined by DFE; and
report the second DFE-determined channel characteristics,
wherein the MIMO transmitter is further configured to determine the modulation and coding scheme based on the first DFE-determined channel characteristics and the second DFE-determined channel characteristics.

17. The wireless system of claim 13, wherein the MIMO transmitter is further configured to determine the modulation and coding scheme for transmitting to the ML MIMO receiver based on the DFE-determined channel characteristics.

* * * * *